Sept. 21, 1954 M. G. STROMQUIST 2,689,406
BEVEL PROTRACTOR
Filed Jan. 27, 1953
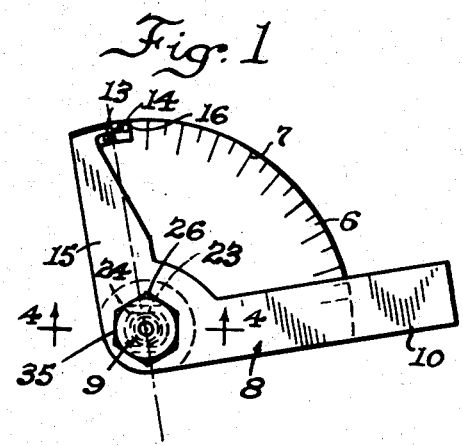
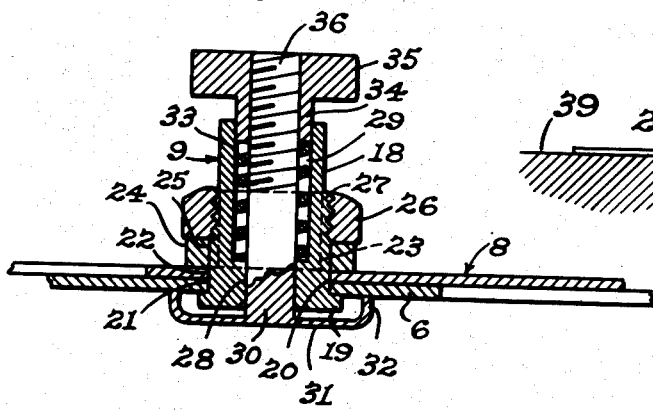
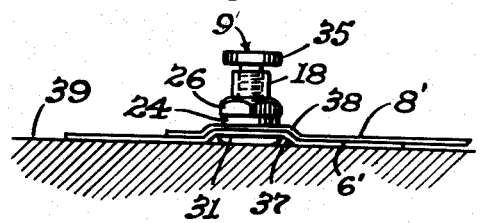
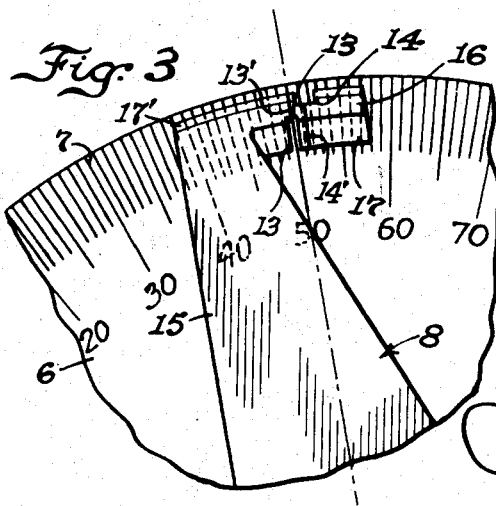
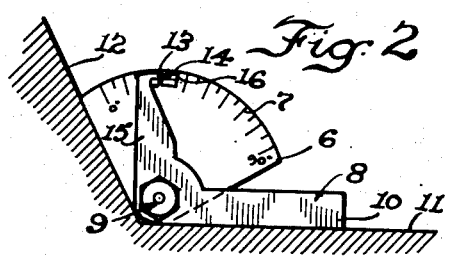
Inventor
Martin G. Stromquist Patented Sept. 21, 1954

2,689,406

UNITED STATES PATENT OFFICE 2,689,406

BEVEL PROTRACTOR

Martin G. Stromquist, Rockford, Ill.

Application January 27, 1953, Serial No. 333,409

5 Claims. (Cl. 33—115)

This invention relates to measuring instruments, such as bevel protractors.

The principal object of my invention is to provide an improved tension joint for instruments of the kind mentioned which has two tension adjustments, one of which may be set more or less permanently for a light friction drag that will enable easy manipulation of the instrument to a given angle, and the other of which is adjustable at will to apply as much additional spring loaded friction drag as the operator desires, this latter adjustment being so arranged with respect to the first adjustment that it is entirely independent and the tightening or loosening of it cannot affect the angle to which the instrument may have been adjusted.

The invention is illustrated in the accompanying drawing, in which—

Fig. 1 is a face view of a bevel protractor having an improved tension joint made in accordance with my invention;

Fig. 2 is a similar view on a smaller scale showing how the instrument is used in measuring the angle of a bevel;

Fig. 3 is an enlargement of a portion of Figs. 1 and 2, illustrating the two index marks, which are spaced one and one-half degrees apart, as an aid to closer reading of angles;

Fig. 4 is an enlarged section through the improved tension joint taken on the line 4—4 of Fig. 1, and Fig. 5 is an edgewise view of a bevel protractor like that shown in Figs. 1 to 4, but having the adjustable tension joint in embossed pivotally connected portions of the parts.

Similar reference numerals are applied to corresponding parts throughout these views.

Referring first to Figs. 1 to 4, the reference numeral 6 designates a segmental plate forming the body or base of the instrument with suitable graduations along the arcuate periphery, as indicated at 7, and 8 is the cooperating right angle member pivoted at 9 with respect to plate 6. One arm 10 of the right angle member 8 is adapted to bear along one edge on the work on the surface 11, as indicated in Fig. 2, and the plate 6 is swung into a position engaging along its one edge the bevel 12, whereupon the reading for the angle is taken by reference to either of two index slots or notches 13 and 14 and accompanying index marks 13' and 14' are provided on the other arm 15 of the right angle member 8. The slots 13 and 14 are provided on the radially inner and outer edges respectively, of an arcuate lateral extension 16 provided on the outer end of the arm 15, and mark 13' associated with the longer slot or notch 13 is used most of the time in taking readings, because, as appears in Fig. 1, it is on the zero degree (0°) line when the instrument is closed. The other mark 14' associated with the outer and shorter slot or notch 14 is spaced one and one-half degrees (1½°) from mark 13', when the graduations 7 are one degree (1°) apart. In that way it is a simple matter to read accurately to within at least one-half a degree (½°), because in the event the mark 13' does not register with one of the graduation lines 7, the chances are the auxiliary mark 14' will register with a line, or come close to such registration, and the operator, making allowance for the one and one-half degrees (1½°) spacing of marks 13' and 14', can quickly read the angle indicated. If only one mark 13' were provided, the operator could, of course, approximate the reading, but in that event would have nothing with which to gauge his approximation. The second mark 14' is therefore a real help. The inner edge portion 17 of the extension 16 is bevelled, as best appears in Figs. 1 and 3, to facilitate taking readings. Extension of line 14' inwards over this bevel, as shown, enables taking close readings with greater reliability. The outer edge portion 17' of the extension 16 is also bevelled, as best shown in Fig. 3, to facilitate taking readings. Extension of line 13' outwards over this bevel, as shown, enables taking close readings with greater reliability.

The improved tension joint of my invention is incorporated in pivot 9 which is specially constructed, as appears in Figs. 1 and 4, with a view to providing a more or less permanently adjustably fixed friction drag and also a readily adjustable spring tension to increase the resistance to relative pivotal movement of the parts 6 and 8 to whatever extent the operator may desire in a given situation. The pivot 9 consists of a hollow stud 18 having a flat head 19 on one end and a smooth cylindrical shank portion 20 next to the head, that has a close working fit in registering cylindrical holes 21 and 22 provided in the parts 6 and 8. Parallel flats are provided on the stud 18 on diametrically opposite sides intermediate its ends and upwards from the smooth cylindrical shank portion 20, as indicated at 23, and a washer 24 having an oblong hole 25 is nonrotatable on the stud 18 by reason of its abutment with the flats 23 so that a nut 26 threaded on the stud 18 at 27 may be tightened to exert more or less friction drag by pressure between head 19 and washer 24. The nut 26 can, of course, be adjusted to maintain a certain friction drag more or less permanently, and inasmuch as there is nothing to tend to loosen the nut 26 in the normal usage of the instrument, the nut is never apt to require tightening unless the instrument is used frequently and there is sufficient wear on the parts to necessitate tightening of the nut to maintain the desired amount of friction drag. Now, there is a center hole 28 provided in the head end of stud 18 and a registering coaxial bore 29 in the shank portion, and a bolt 30 is entered through the hole 29 and has a hollow circular flat head 31 which encloses the head end 19 of the stud and has its annular rim portion 32 abutting the bottom face of the plate 6 in radially outwardly spaced relation to the head 19, as clearly appears in Fig. 4. This bolt 30 has a coiled compression spring 33 surrounding it and housed in the bore 29 and arranged to be compressed between the inner end of the bore and the reduced cylindrical shank portion 34 of a nut 35 that is threaded on the threaded end portion 36 of the bolt. Obviously, the more the nut 35 is tightened the greater is the spring loading on the head 31 pressing the parts 6 and 8 together to give increased friction drag, above that afforded by the adjustment of nut 26. The operator can, therefore, obtain as much friction drag on the operation of the instrument as he prefers under given circumstances, without changing the adjustment of the nut 26. The nut 35 will when tightened far enough contact the end of stud 18 and thus prevent further tightening before the spring 33 is compressed to the point of closing the coils thereof solidly upon one another. Consequently, this portion of the tension adjustment always exerts yielding tension, the extent of the tension depending, of course, upon how much the nut 35 is tightened. This double tension adjustment, one of which may be more or less permanently fixed and is positive, and the other of which is quickly adjustable and applies more or less spring tension as may be desired to increase the friction drag, is, of course, useful on various instruments and tools, wherever a similarly tensioned pivotal joint is needed. Aside from the flexibility of the adjustment which the construction just described affords, it should, of course, be clear that the construction is such that the adjustments may be made without danger of affecting the setting of the instrument. In many pivotal joints designed to be tensioned, the constructions employed are such that the tightening of the tension nut has a tendency to exert a twist on the members that are pivotally connected by the joint, thereby making it difficult to loosen or tighten the nut and still maintain a given angular setting of the members.

If the projecting head end 31 of the bolt 30 constitutes an objection, the pivoted parts 6 and 8 may have their pivotally connected portions embossed, as indicated in Fig. 5, at 37 and 38, so that the flat bottom of the head 31 lies flush with the bottom of the part 6' and the instrument may, therefore, be slid freely on a flat surface 39 and readings can be taken accurately. However, for most purposes, the projecting head 31 is not considered objectionable and the construction disclosed in Figs. 1 to 4 is preferred.

It is believed the foregoing description conveys a good understanding of the objects and advantages of my invention. The appended claims have been drawn to cover all legitimate modifications and adaptations.

I claim:

1. For use with an instrument, such as a protractor, comprising two members pivotally adjustable relative to one another and adapted to be held frictionally in different adjusted positions, a friction pivot joint adjustable manually to vary the friction drag imposed upon the members and including a central tubular element having a head frictionally engaging one of said members, and a friction drag washer surrounding said central element in spaced relation to said head and pressed by means of a nut threaded on said central element into frictional engagement with the other of said members to resist relative pivotal movement to a predetermined extent, a bolt extending through said central element having a hollow head on one end annularly enclosing and spaced from the first named head and frictionally engaging the first mentioned member, a resilient compressible member surrounding said bolt and bearing against the central element, and a nut threaded on said bolt and arranged to compress said resilient compressible members, said first mentioned nut being adapted to be adjusted infrequently to give a steady relatively light friction drag, and said last mentioned nut being adjusted frequently to give a relatively heavier and variable friction drag.

2. A structure as set forth in claim 1 wherein said central tubular element has a counterbore provided therein in which said resilient compressible member is received, said last mentioned nut threading on said bolt having a reduced cylindrical shank portion entered in said counterbore to compress said resilient compressible member therein.

3. A structure as set forth in claim 1 wherein said pivoted members have their pivotally connected portions embossed so that the hollow head of said bolt does not protrude below the plane of the rest of the member that is frictionally engaged by said head.

4. For use with an instrument, such as a protractor, comprising two members pivotally adjustable relative to one another and adapted to be held frictionally in different adjusted positions, a friction pivot joint adjustable manually to vary the friction drag imposed upon the members and including a central tubular element having a head frictionally engaging one of said members, and a friction drag washer surrounding said central element in spaced relation to said head and pressed by means of a nut threaded on said central element into frictional engagement with the other of said members to resist relative pivotal movement to a predetermined extent, a bolt extending through said central element having a hollow head on one end annularly enclosing and spaced from the first named head and frictionally engaging the first mentioned member, said central tubular element having a counterbore provided therein, a coiled compression spring surrounding said bolt and bearing against the central element in said counterbore, and a nut threaded on said bolt and having a reduced cylindrical shank portion entered in said counterbore and arranged to compress said spring, said nut being arranged to engage the end of said central tubular element positively to limit tightening thereof before the coils of said spring are closed solidly, said first mentioned nut being adapted to be adjusted infrequently to give a steady relatively light friction drag, and said last mentioned nut being adapted to be adjusted frequently to give a relatively heavier and variable friction drag.

5. A structure as set forth in claim 4 wherein said pivoted members have their pivotally connected portions embossed so that the hollow head of said bolt does not protrude below the plane of the rest of the member that is frictionally engaged by said head.

References Cited in the file of this patent

UNITED STATES PATENTS

| Number | Name | Date |
|---|---|---|
| 1,285,175 | Hinkle | Nov. 19, 1918 |
| 1,879,941 | McCabe | Sept. 27, 1932 |
| 2,361,807 | Wolfe | Oct. 31, 1944 |
| 2,562,224 | Weyrick | July 31, 1951 |

FOREIGN PATENTS

| Number | Country | Date |
|---|---|---|
| 253,249 | Great Britain | June 17, 1926 |